United States Patent
Hamada

(10) Patent No.: US 8,018,427 B2
(45) Date of Patent: Sep. 13, 2011

(54) ILLUMINATION DEVICE AND LIQUID CRYSTAL DISPLAY DEVICE PROVIDED THEREWITH

(75) Inventor: Tetsuya Hamada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 588 days.

(21) Appl. No.: 12/293,635

(22) PCT Filed: Nov. 2, 2006

(86) PCT No.: PCT/JP2006/321939
§ 371 (c)(1), (2), (4) Date: Sep. 19, 2008

(87) PCT Pub. No.: WO2007/125623
PCT Pub. Date: Nov. 8, 2007

(65) Prior Publication Data
US 2010/0231613 A1    Sep. 16, 2010

(30) Foreign Application Priority Data

Apr. 28, 2006    (JP) .................................. 2006-125093

(51) Int. Cl.
*G09G 3/36* (2006.01)
*G09G 3/32* (2006.01)
(52) U.S. Cl. ............... 345/102; 345/82; 345/84; 345/87
(58) Field of Classification Search ............ 345/55, 345/76, 82, 84, 87, 102, 204, 690; 315/149, 315/158
See application file for complete search history.

(56) References Cited

U.S. PATENT DOCUMENTS

| 7,241,040 | B2* | 7/2007 | Ahn et al. ..................... 362/612 |
| 7,656,371 | B2* | 2/2010 | Shimizu et al. ................. 345/83 |
| 2005/0024847 | A1* | 2/2005 | Ahn et al. ....................... 362/31 |
| 2005/0200295 | A1 | 9/2005 | Lim et al. |
| 2005/0286264 | A1 | 12/2005 | Kim et al. |
| 2006/0007112 | A1* | 1/2006 | Park ............................. 345/102 |
| 2006/0012989 | A1 | 1/2006 | Lee |
| 2006/0071613 | A1 | 4/2006 | Lovato et al. |
| 2006/0232544 | A1* | 10/2006 | Sakashita ....................... 345/102 |
| 2010/0194292 | A1* | 8/2010 | Hamada ......................... 315/158 |

FOREIGN PATENT DOCUMENTS

JP    2001-209049 A    8/2001

(Continued)

OTHER PUBLICATIONS

Official Communication issued in International Patent Application No. PCT/JP2006/321939, mailed on Jan. 23, 2007.

*Primary Examiner* — My-Chau T Tran
(74) *Attorney, Agent, or Firm* — Keating & Bennett, LLP

(57) ABSTRACT

An illumination device includes a light source section with white LEDs on a side of a light guide plate. The white LED includes a first white LED and a second white LED, and they emit light of different chromaticities. In a chromaticity diagram, a white color area is divided into two subareas by a dividing line passing through a target chromaticity; light emitted by the first white LED falls within a first subarea, and light emitted by the second white LED falls within a second subarea. By individually controlling the light emission of the first white LED and the second white LED, it is possible to emanate a desired white light from the light guide plate.

7 Claims, 5 Drawing Sheets

FOREIGN PATENT DOCUMENTS

| | | |
|---|---|---|
| JP | 2002-231032 A | 8/2002 |
| JP | 2004-079461 A | 3/2004 |
| JP | 2004-235046 A | 8/2004 |
| JP | 2005-100799 A | 4/2005 |
| JP | 2005-121688 A | 5/2005 |
| JP | 2005-243396 A | 9/2005 |
| JP | 2005-327608 A | 11/2005 |

* cited by examiner

ILLUMINATION DEVICE AND LIQUID CRYSTAL DISPLAY DEVICE PROVIDED THEREWITH

BACKGROUND OF THE INVENTION

1. Field of the Invention

The present invention relates to an illumination device for use as a backlight in a liquid crystal display device and a liquid crystal display device including such an illumination device.

2. Description of the Related Art

In recent years, products that incorporate, as a display device, a liquid crystal panel thinner than a CRT (cathode ray tube) have been widely used. Since the liquid crystal panel itself emits no light, it displays an image by the use of external light or light emitted from an illumination device.

Conventionally, cold cathode fluorescent tubes have been used as light sources in illumination devices for use in liquid crystal display devices. Today, LED (light emitting diode) lamps also come to be used. In illumination devices incorporating LED lamps as light sources, white LED lamps are used.

Disadvantageously, however, since white LED lamps vary widely in the color of light emitted therefrom, a liquid crystal display device that uses an illumination device incorporating LED lamps as a light source produces, for example, reddish or bluish display, that is, it has poor color rendering properties. JP-A-2002-231032 (page 3, FIG. 1) proposes a backlight that has a light guide plate and uses white LED lamps as a light source disposed on the side of the light guide plate and that subjects either the light guide plate or a reflective plate disposed on the back of the light guide plate to coloration reflection treatment corresponding to the color of light emitted from the white LED lamps and thereby performs color correction.

Disadvantageously, however, the backlight proposed in JP-A-2002-231032 is required to modify and adjust the coloration reflection treatment on a white-LED-lamp's-color-by-white-LED-lamp's-color basis. Only white LED lamps of the same color need to be used; white LED lamps of different colors cannot be used. Moreover, the backlight can only be used as a sidelight backlight, in which LED lamps are disposed on the side of a light guide plate; it cannot be used as a direct-type backlight, in which a larger amount of light emitted therefrom is obtained.

SUMMARY OF THE INVENTION

In order to overcome the problems described above, preferred embodiments of the present invention provide an illumination device that eliminates the need for adjustment on a white-LED-lamp's-color-by-white-LED-lamp's-color basis, that can use white LED lamps of different colors and that can be used as a sidelight backlight or a direct-type backlight.

An illumination device according to a preferred embodiment of the present invention includes: a plurality of white LEDs; and a control device controlling light emission of the white LEDs. Here, a white color area in a chromaticity diagram is divided into a plurality of subareas, white LEDs whose emitted light falls within any one of the subareas are provided and the control device individually controls light emission of the white LEDs whose emitted light falls the different subareas.

A liquid crystal display device according to a preferred embodiment of the present invention includes a liquid crystal panel and the illumination device disposed on the back of the liquid crystal panel and configured as described above.

According to a preferred embodiment of the present invention, even when white LEDs that emit light of a desired chromaticity are not used, the use of white LEDs that fall within different subareas allows an illumination device as a whole to emit light of the desired chromaticity. Thus, even when the white LEDs that emit light of the desired chromaticity cannot be procured, inexpensive white LEDs that emit light of other chromaticities can be used, and it is unnecessary to specify and purchase only the white LEDs that emit light of the desired chromaticity. This helps produce an illumination device that emits light of the desired chromaticity at low cost.

According to another preferred embodiment of the present invention, light emitted by white LEDs disposed side by side falls within different subareas, and thus light emitted by the white LEDs can be evenly mixed. This helps reduce variations in light emitted by an illumination device.

According to another preferred embodiment of the present invention, there is provided a sidelight illumination device having a light guide plate or a direct-type illumination device in which white LEDs are arranged in a plane.

According to another preferred embodiment of the invention, it is possible to adjust, as necessary, and maintain the chromaticity of light emitted by an illumination device at a desired level by controlling the emitted light based on an output of a color measuring device.

According to another preferred embodiment of the invention, it is possible to maintain the chromaticity of light emitted by an illumination device at a desired level by controlling the light emission of white LEDs based on an output of a temperature measuring device even if the chromaticities of the white LEDs vary with temperature and the temperatures of the white LEDs vary during a prolonged period immediately after the lighting of the illumination device.

According to another preferred embodiment of the invention, it is possible to obtain a liquid crystal display device having high display quality by adjusting light emitted by an illumination device to a suitable chromaticity for display.

Other features, elements, steps, characteristics and advantages of the present invention will become more apparent from the following detailed description of preferred embodiments of the present invention with reference to the attached drawings.

BRIEF DESCRIPTION OF THE RELATED ART

DETAILED DESCRIPTION OF THE PREFERRED EMBODIMENTS

First Preferred Embodiment

Figure 1:
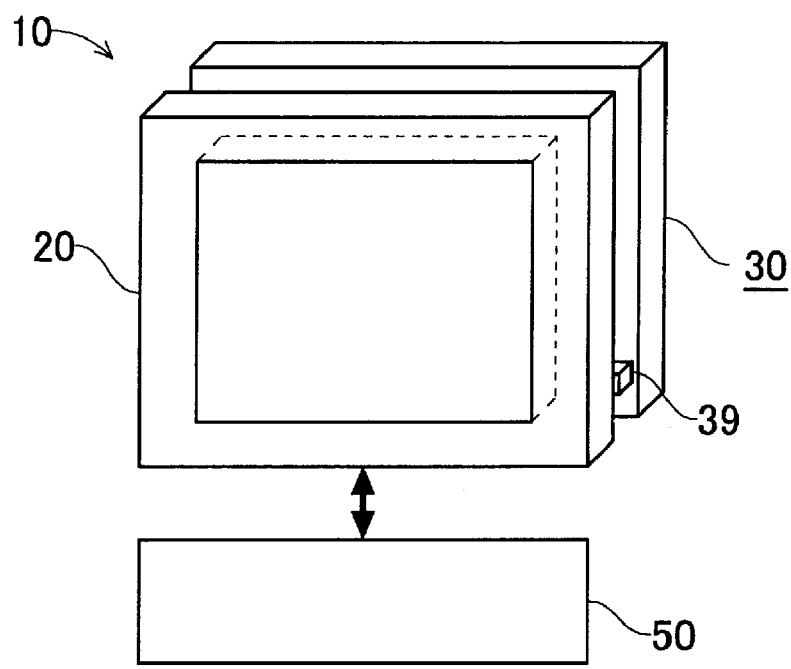
FIG. 1 is a diagram schematically showing the configuration of a liquid crystal display device according to a first preferred embodiment of the present invention.
Figure 2:
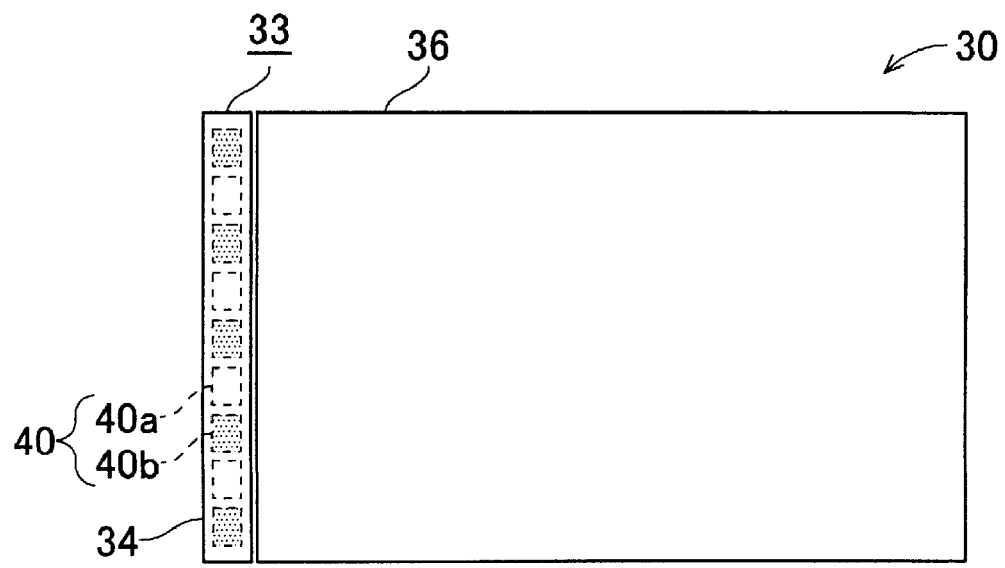
FIG. 2 is a plan view of a backlight according to the first preferred embodiment of the present invention.
Figure 3:
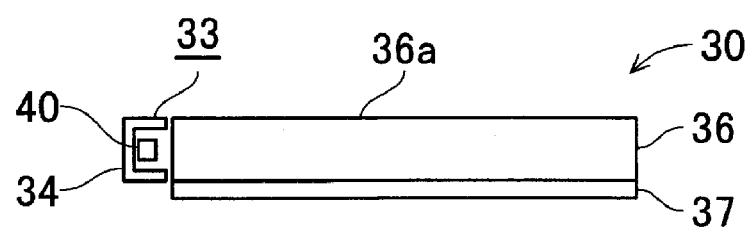
FIG. 3 is a front view of the backlight according to the first preferred embodiment of the present invention.

A first preferred embodiment of the present invention will be described with reference to the accompanying drawings. FIG. 1 is a diagram schematically showing the configuration of a liquid crystal display device according to the first preferred embodiment of the invention. FIG. 2 is a plan view of a backlight according to the first preferred embodiment of the invention. FIG. 3 is a front view of the backlight according to the first preferred embodiment of the invention.

As shown in FIG. 1, the liquid crystal display device 10 has a liquid crystal panel 20, the backlight 30 serving as an illumination device and a control device 50. The liquid crystal panel 20 has a TFT substrate, an opposite substrate and liquid crystal sealed in therebetween; the orientation of the liquid crystal is controlled by applying voltage to both the substrates based on signals from the control device 50, and this allows an image to be displayed. The backlight 30 is disposed on the back of the liquid crystal panel 20 and shines white light emitted from its emission surface on the liquid crystal panel 20 to display an image. The control device 50 controls currents passed through not only the liquid crystal panel 20 but also the backlight 30.

As shown in FIGS. 2 and 3, the backlight 30 of this preferred embodiment has a light source section 33, a light guide plate 36 and a reflective plate 37; the backlight 30 is a sidelight backlight. The light source section 33 has a reflector 34 and white LEDs 40 disposed inside the reflector 34. The light source section 33 is arranged such that light emitted from the white LEDs 40 enters the light guide plate 36 through its side surface. The reflective plate 37 is disposed so as to face the side of the light guide plate 36 opposite to the side facing the liquid crystal panel 20.

Light emitted from the white LEDs 40 in the light source section 33 enters, from the opening of the reflector 34, the light guide plate 36 through its side surface, either directly from the white LEDs 40 or by reflection from the inner surface of the reflector 34. Then, the light travels through the inside of the light guide plate 36 and emanates as white light from its emission surface 36*a* opposite the liquid crystal panel 20. Light directed from the light guide plate 36 to the reflective plate 37 is reflected by the reflective plate 37 back to the light guide plate 36, and travels through the inside of the light guide plate 36.

Figure 4:
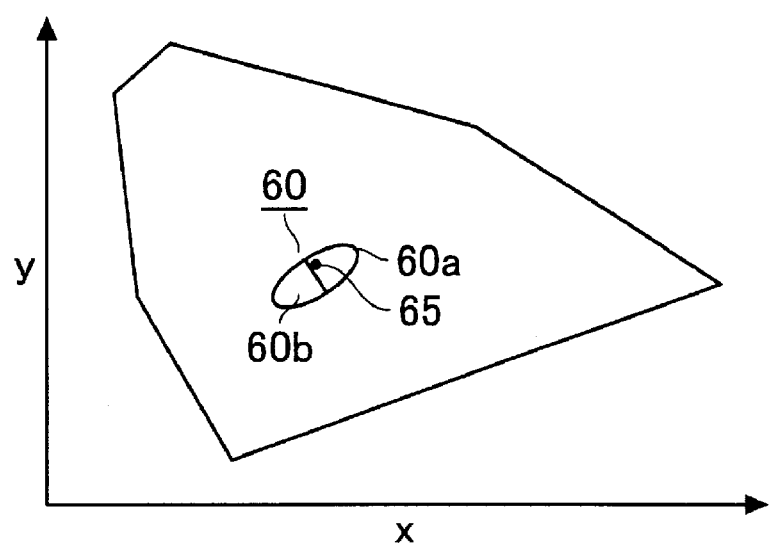
FIG. 4 is a chromaticity diagram showing the division of a white color area.

A description will now be given of white light with reference to a chromaticity diagram shown in FIG. 4. The area indicated by an ellipse in the center of FIG. 4 is a white color area 60. Different locations inside the white color area 60 represent different white hues. The chromaticity indicated in the upper right portion of the white color area 60 represents a yellowish white color; the chromaticity indicated in the upper left portion of the white color area 60 represents a greenish white color; the chromaticity indicated in the lower left portion of the white color area 60 represents a bluish white color; and the chromaticity indicated in the lower right portion of the white color area 60 represents a reddish white color. Preferably, light shone on the liquid crystal panel 20 has a chromaticity near the center of the white color area 60. In this preferred embodiment, this chromaticity is assumed to be a target chromaticity 65.

In this preferred embodiment, as shown in FIG. 4, the white color area 60 is divided into two subareas, namely, a first subarea 60*a* located in the upper right portion of the white color area 60 and a second subarea 60*b* located in the lower left portion of the white color area 60. The white LED 40 preferably includes a first white LED 40*a* whose emitted light falls within the first subarea 60*a* and a second white LED 40*b* whose emitted light falls within the second subarea 60*b*. The boundary between the first subarea 60*a* and the second subarea 60*b* needs to pass through the target chromaticity 65 so that light emitted by the first white LEDs 40*a* and the second white LEDs 40*b* allows light emanated from the emission surface 36*a* of the light guide plate 36 to be adjusted to have the target chromaticity 65.

The control device 50 individually controls the continuity of the first white LEDs 40*a* and the second white LEDs 40*b* to control the brightness thereof. This can be achieved by individually electrically connecting the first white LEDs 40*a* and the second white LEDs 40*b* to the control device 50. One way to achieve such connection is to connect a first white LED group composed of only the first white LEDs 40*a* connected in series and a second white LED group composed of only the second white LEDs 40*b* connected in series individually to the control device 50. Only one first white LED group may be formed by connecting all the first white LEDs 40*a* in series. A plurality of first white LED groups may be formed by dividing the first white LEDs 40*a* into a plurality of pieces, and each first white LED group may be individually connected to the control device 50. This applies equally to the second white LEDs 40*b* and the second white LED group.

Preferably, the first white LEDs 40*a* and the second white LEDs 40*b* are arranged as separately as possible from each other so that light emitted therefrom is evenly mixed. Most preferably, as shown in FIG. 2, the first white LEDs 40*a* and the second white LEDs 40*b* are alternately arranged. In this case, when the first white LEDs 40*a* are equal in number to the second white LEDs 40*b*, and a current passed through the first white LEDs 40*a* is equal in magnitude to a current passed through the second white LEDs 40*b*, the chromaticity of emitted light is intermediate between the average of chromaticities of light emitted from the first white LEDs 40*a* and the average of chromaticities of light emitted from the second white LEDs 40*b*.

A color measuring device 39 for measuring the chromaticity of light emitted by the white LEDs 40 and emanated from the emission surface 36*a* of the light guide plate 36 is provided between the backlight 30 and the liquid crystal panel 20. The color measuring device 39 is formed by, for example, photodiodes.

In this preferred embodiment, when power is turned on, the liquid crystal display device 10 first lights only the first white LEDs 40*a* under the control of the control device 50, then measures the chromaticity of emitted light with the color measuring device 39 and receives its output with the control device 50. Then, the liquid crystal display device 10 turns off the first white LEDs 40*a* and lights only the second white LEDs 40*b*, then measures the chromaticity of emitted light with the color measuring device 39 similarly and receives its output with the control device 50. The order of the steps described above may be reversed. Then, a current passed through the first white LEDs 40*a* and a current passed through the second white LEDs 40*b* are determined by the control device 50 based on these measurement results so that the chromaticity of light emanated from the emission surface 36*a* of the light guide plate 36 is brought close to the target chromaticity 65.

With this configuration, even when purchased white LEDs vary in chromaticity, the chromaticity of light emanated from the emission surface 36a of the light guide plate 36 can be brought close to the target chromaticity 65. This makes it unnecessary to sort out and use white LEDs having a given chromaticity in the backlight 30 and subject the light guide plate or other components to coloration reflection treatment corresponding to the chromaticity.

Figure 5:
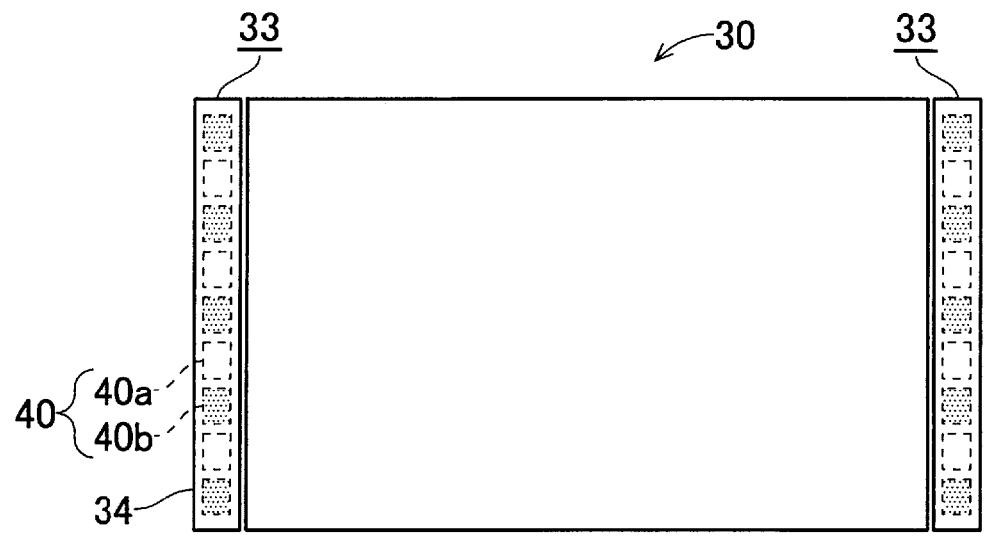
FIG. 5 is a plan view of a backlight according to another aspect of the first preferred embodiment of the present invention.
Figure 6:
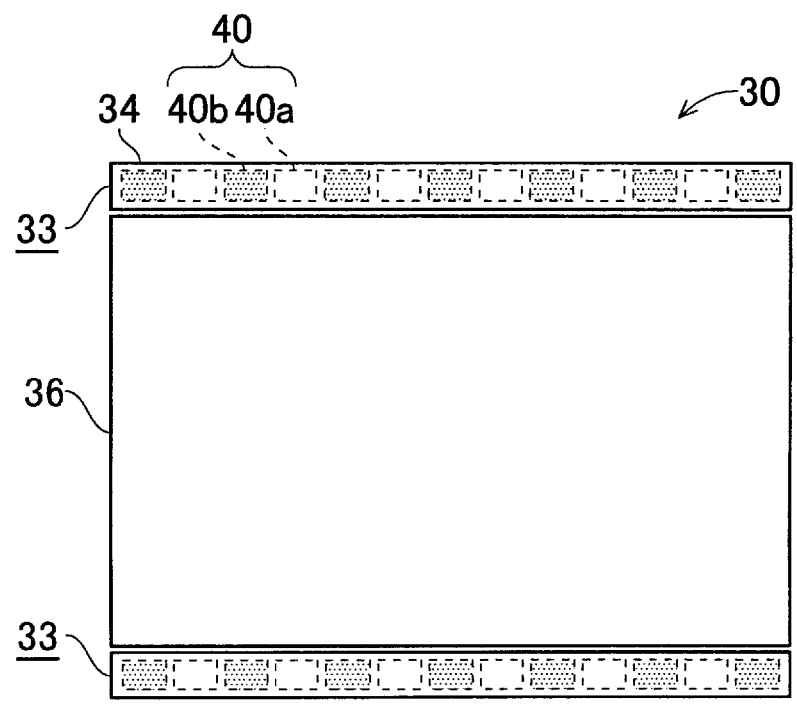
FIG. 6 is a plan view of a backlight according to another aspect of the first preferred embodiment of the present invention.

In this preferred embodiment, the light source section 33 may be disposed on only one side of the light guide plate 36 as shown in FIG. 3, and it may be disposed on each opposite side of the light guide plate 36 as shown in FIG. 5. The side on which the light source section 33 is disposed is not limited to the short side of the light guide plate 33, and the light source sections 33 may be disposed on the long sides as shown in FIG. 6 and they may be disposed on both the short and long sides. With a plurality of light source sections 33, it is possible to increase the brightness of light emanated from the emission surfaces 36a of the light guide plates 36. Placing the light source section 33 on the long side allows a larger number of white LEDs 40 to be disposed thereon than on the short side. Thus, it is possible to increase the brightness of light emanated from the emission surfaces 36a of the light guide plates 36 similarly. By increasing the brightness of light emanated from the emission surfaces 36a of the light guide plates 36 in this way, it is possible to improve the display quality of the liquid crystal display device 10.

Second Preferred Embodiment

Figure 7:
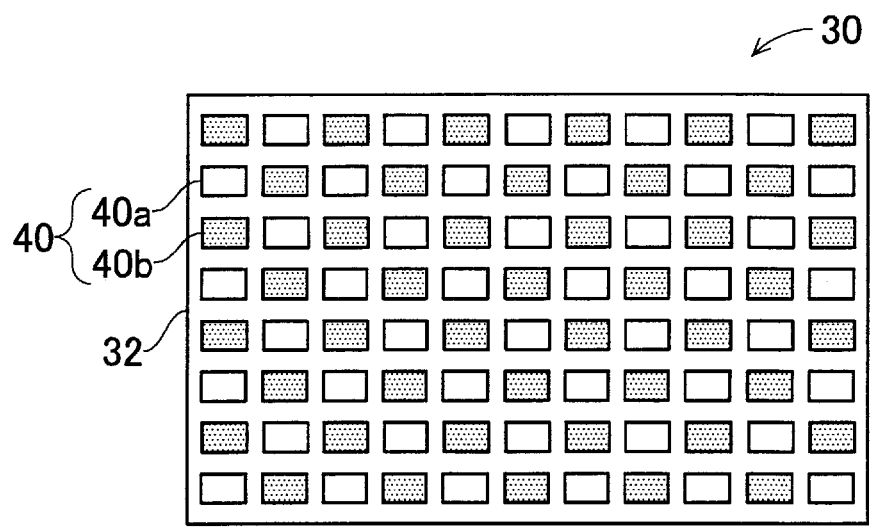
FIG. 7 is a plan view of a backlight according to a second preferred embodiment of the present invention.

A second preferred embodiment of the present invention will be described with reference to the accompanying drawings. FIG. 7 is a plan view of a backlight according to the second preferred embodiment. The second preferred embodiment is the same as the first preferred embodiment except that the configuration of the backlight is different from each other, and such parts as are substantially the same as each other are identified with common reference numerals.

As shown in FIG. 7, the backlight 30 of the second preferred embodiment has a substrate 32 on which white LEDs 40 are mounted, and the backlight 30 is a direct-type backlight. As shown in FIG. 1, the backlight 30 is disposed on the back of the liquid crystal panel 20. The substrate 32 is substantially as large as the liquid crystal panel 20. The white LEDs 40 are arranged on the substrate 32 vertically and horizontally, in a plane.

In this preferred embodiment, as in the first preferred embodiment, the white LED 40 is composed of the first white LED 40a whose emitted light falls within the first subarea 60a of the white color area 60 in the chromaticity diagram shown in FIG. 4 and the second white LED 40b whose emitted light falls within the second subarea 60b. The continuity of the first white LEDs 40a and the second white LEDs 40b is individually controlled by the control device 50, and thus the brightness thereof is adjusted.

Preferably, the first white LEDs 40a and the second white LEDs 40b are arranged as separately as possible from each other so that light emitted therefrom is evenly mixed. Most preferably, as shown in FIG. 7, the white LEDs 40 that fall within different subareas are arranged side by side. In this case, when the first white LEDs 40a are equal in number to the second white LEDs 40b, and a current passed through the first white LEDs 40a is equal in magnitude to a current passed through the second white LEDs 40b, the chromaticity of emitted light is intermediate between the average of chromaticities of light emitted from the first white LEDs 40a and the average of chromaticities of light emitted from the second white LEDs 40b.

A color measuring device 39 for measuring the chromaticity of light emitted by the white LEDs 40 is provided between the backlight 30 and the liquid crystal panel 20.

As in the first preferred embodiment, when power is turned on, the liquid crystal display device 10 first lights only the first white LEDs 40a under the control of the control device 50, then measures the chromaticity of light emitted by the backlight 30 with the color measuring device 39 and receives its output with the control device 50. Then, the liquid crystal display device 10 turns off the first white LEDs 40a and lights only the second white LEDs 40b, then measures the chromaticity of emitted light with the color measuring device 39 similarly and receives its output with the control device 50. The order of the steps described above may be reversed. Then, a current passed through the first white LEDs 40a and a current passed through the second white LEDs 40b are determined by the control device 50 based on these measurement results so that the chromaticity of light emanated from the emission surface 36a of the light guide plate 36 is brought close to the target chromaticity 65.

With this configuration, as in the first preferred embodiment, even when purchased white LEDs vary in chromaticity, the chromaticity of light emanated from the emission surface 36a of the light guide plate 36 can be brought close to the target chromaticity 65. Moreover, since a larger number of white LEDs 40 can be arranged than in the sidelight backlight of the first preferred embodiment, the brightness of the backlight 30 is increased. Thus, it is possible to improve the display quality of the liquid crystal display device 10.

Figure 8:
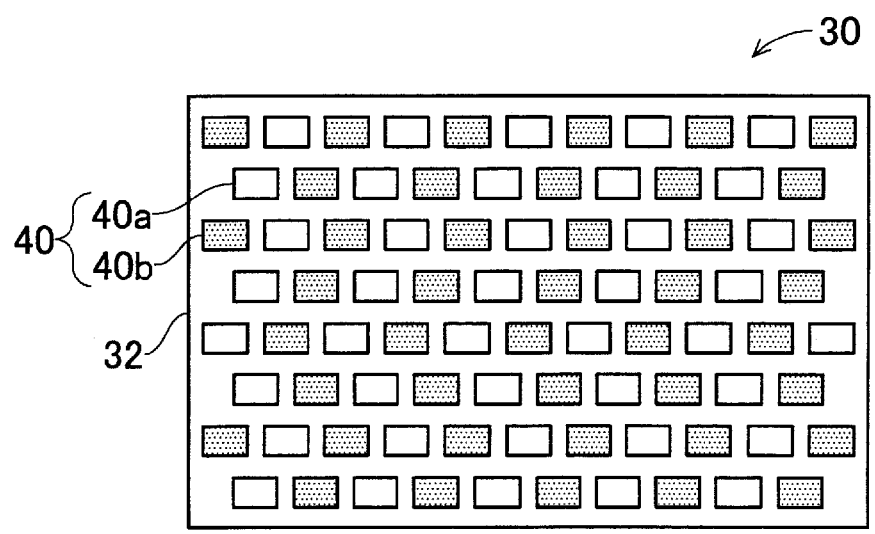
FIG. 8 is a plan view of a backlight according to another aspect of the second preferred embodiment of the present invention.

Although this preferred embodiment deals with the case where the white LEDs 40 are arranged in a rectangular lattice as shown in FIG. 7, the arrangement of the white LEDs 40 is not limited to rectangular lattice arrangement. The white LEDs 40 may be arranged in a square lattice or may be arranged in triangular lattices as shown in FIG. 8. When the white LEDs 40 are arranged in triangular lattices, one white LED 40 is adjacent to six other white LEDs 40. Thus, when the white color area 60 is divided into two subareas, it is impossible to prevent the white LEDs 40 falling within the same subarea from being adjacent to each other. In this case, preferably, white LEDs 40 arranged side by side in at least one direction such as a horizontal direction shown in FIG. 8 fall within different subareas.

In the first and second preferred embodiments, while the liquid crystal display device 10 is energized or operated, the chromaticity of light emanated from the emission surface 36a of the light guide plate 36 may be measured by the color measuring device 39 as necessary, and a current passed through the first white LEDs 40a and a current passed through the second white LEDs 40b may be adjusted by the control device 50 based on the output of the color measuring device 39. In this case, when the chromaticity of light emanated from the emission surface 36a of the light guide plate 36 is changed to represent a bluish white color, the current through the first white LEDs 40a needs to be increased or the current through the second white LEDs 40b needs to be decreased. When the chromaticity is changed to represent a yellowish white color, the current through the second white LEDs 40b needs to be increased or the current through the first white LEDs 40a needs to be decreased.

Figure 9:
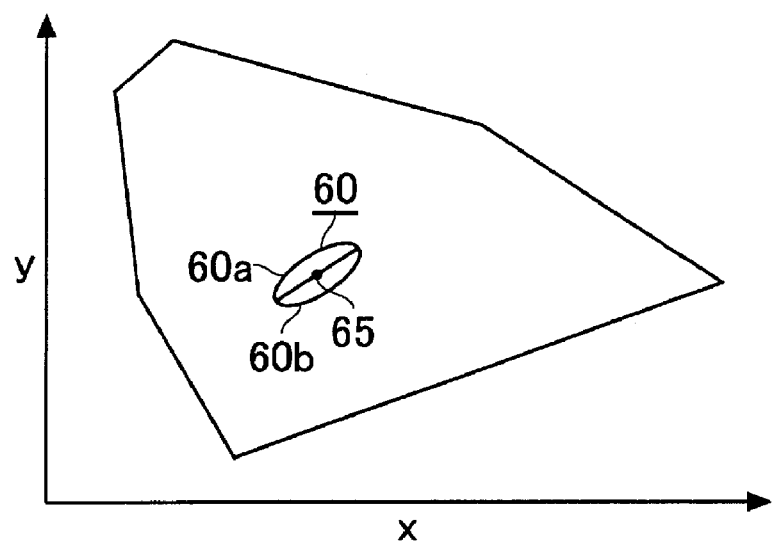
FIG. 9 is a chromaticity diagram showing another division of the white color region.

The division of the white color area 60 is not limited to that shown in FIG. 4. As long as the boundary between subareas is located near the target chromaticity, as shown in FIG. 9, the white color area 60 may be divided into a first subarea 60a in the upper left portion of the white color area 60 and a second subarea 60b in the lower right portion thereof, or it may be divided into three or more subareas. In a case where the white color area 60 is divided into three or more subareas, in order for the target chromaticity 65 to be obtained, any one of the boundaries of the subareas needs to pass through the target chromaticity 65, and the backlight 30 needs to have white LEDs 40 that fall within each subarea.

Third Preferred Embodiment

Figure 10:
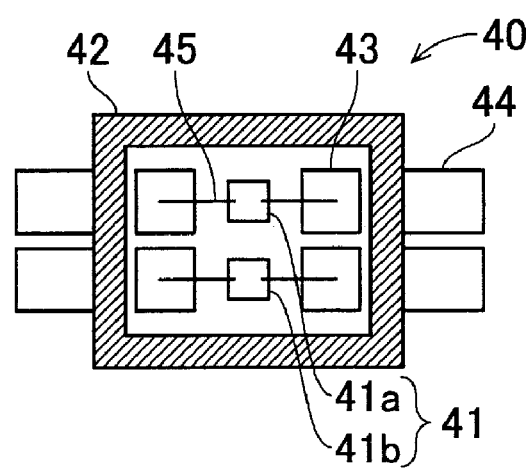
FIG. 10 is a diagram schematically showing the configuration of a white LED according to a third preferred embodiment of the present invention.

A third preferred embodiment of the present invention will be described with reference to the accompanying drawings. FIG. 10 is a diagram schematically showing the configuration of a white LED according to the third preferred embodiment. The third preferred embodiment is the same as the first and second preferred embodiments except that the configuration of the white LED is different from each other.

As shown in FIG. 10, the white LED 40 of this preferred embodiment has a frame 42 formed of white resin (the frame 42 is filled with transparent resin), two pairs of lead frames 43, terminals 44 connected to the lead frames 43 and two LED chips 41. Inside the frame 42, the LED chips 41 are connected with wires 45 to the lead frames 43 located on the right and left sides of the figure. The LED chips 41 emit white light; they are formed by, for example, sealing an LED element emitting blue light when being energized with resin containing fluorescent material that emits, when receiving light, yellow light whose color serves as a complementary color for blue. The wires 45 are bonding wires, and bonding wires formed of, for example, gold may be used. The terminals 44 disposed outside the frame 42 are used to connect to the control device 50 and adjacent white LEDs 40. In FIG. 10, the frame 42 is shown in cross section. The backlight 30 of this preferred embodiment may be either a sidelight backlight or a direct-type backlight.

In this preferred embodiment, the LED chip 41 included in the white LED 40 is composed of the first LED chip 41a whose emitted light falls within the first subarea 60a of the white color area 60 in the chromaticity diagram shown in FIG. 4 and the second LED chip 41b whose emitted light falls within the second subarea 60b. The continuity of the first LED chips 41a and the second LED chips 41b is individually controlled by the control device 50, and thus the brightness thereof is adjusted. This can be achieved by individually electrically connecting the first LED chips 41a and the second LED chips 41b to the control device 50. Specifically, this can be achieved by the following: since the first LED chips 41a and the second LED chips 41b are connected to different terminals 44, a first LED chip group composed of only the first LED chips 41a connected in series and a second LED chip group composed of only the second LED chips 41b connected in series, for example, are provided, and each LED chip group is connected directly to the control device 50. A plurality of LED chip groups may be provided.

Between the backlight 30 and the liquid crystal panel 20, a color measuring device 39 for measuring the chromaticity of light emitted by the white LEDs 40 is provided in such a position as not to block the display of the liquid crystal panel 20, for example, in its perimeter.

In this preferred embodiment, when power is turned on, the liquid crystal display device 10 first lights only the first LED chips 41a in the white LEDs 40 under the control of the control device 50, then measures the chromaticity of light emitted by the backlight 30 with the color measuring device 39 disposed between the backlight 30 and the liquid crystal panel 20 and receives its output with the control device 50. Then, the liquid crystal display device 10 turns off the first LED chips 41a and lights only the second LED chips 41b, then measures the chromaticity of emitted light with the color measuring device 39 similarly and receives its output with the control device 50. The order of the steps described above may be reversed. Then, a current passed through the first LED chips 41a and a current passed through the second LED chips 41b are determined by the control device 50 based on these measurement results so that the chromaticity of light emanated from the emission surface 36a of the light guide plate 36 is brought close to the target chromaticity 65.

With this configuration, even when purchased white LEDs vary in chromaticity, the chromaticity of light emitted by the backlight 30 can be brought close to the target chromaticity 65. Moreover, it is possible to make uniform the chromaticity of light emitted from the white LEDs 40 and thus reduce variations in color significantly. This results in improved display quality of the liquid crystal display device 10.

In this preferred embodiment, the white color area 60 may be freely divided as in the first preferred embodiment as long as the boundary between the subareas is disposed near the target chromaticity. In a case where the white color area 60 is divided into three or more subareas, in order to obtain the target chromaticity, it is necessary to provide LED chips 41 whose emitted light falls within each subarea. In this case, all the LED chips 41 falling within each subarea may be provided in one white LED 40, or, for example, the LED chips 41 of any two of the three subareas may be provided in one white LED 40 and the backlight 30, as a whole, may include all the LED chips 41 that fall within each subarea.

In the first to third preferred embodiments, a temperature measuring device connected to the control device 50 may be provided near the white LED 40. For example, when the backlight is a sidelight backlight, the temperature measuring device may be provided inside the reflector 34; when the backlight is a direct-type backlight, it may be provided on the substrate 32.

The chromaticity of light emitted by the white LED 40 varies as its temperature varies. As the temperature increases, the chromaticity shifts, for example, from the upper right portion of the chromaticity diagram to the lower left portion, that is, its color changes from a yellowish color to a bluish color. The temperature-dependent characteristics of chromaticities of the first white LEDs 40a and the second white LEDs 40b are measured in advance, and based on these measurement results and temperatures measured with the temperature measuring device, the control device 50 controls the light emission of the first white LED 40a and the second white LED 40b. Thus, it is possible to keep the chromaticity of light emitted by the backlight 30 near the target chromaticity 65 even when the temperatures of the white LEDs 40 vary and this causes variations in the chromaticity of emitted light.

For example, as time elapses from the beginning of the lighting of the backlight 30, the temperatures of the white LEDs 40 increase, and the chromaticity of emitted light changes from a yellowish color to a bluish color. Based on the temperature-dependent characteristics measured with the control device 50 and the temperatures measured with the temperature measuring device, a current passing through the first white LEDs 40a whose emitted light originally has a yellowish color is increased more than the initial current, and a current passing through the second white LED 40b whose emitted light originally has a bluish color is decreased than the initial current, that is, the ratio of the current passing through the second white LEDs 40b to the current passing through the first white LEDs 40a is reduced. In this way, it is possible to keep the chromaticity of light emitted by the backlight 30 near the target chromaticity 65 by canceling out variations in the chromaticity of light emitted by the white LEDs 40 due to temperature variations.

The provision of the temperature measuring device together with the color measuring device 39 makes it possible to improve accuracy with which the chromaticity of light emitted by the backlight 30 is controlled within the target chromaticity 65. Even when the temperature measuring device is only provided without the provision of the color measuring device 39, such control can also be achieved. In this case, when the backlight 30 is produced, the temperature of the backlight 30 is varied, and currents are measured that are passed through the first white LEDs 40a and the second white LEDs 40b at different temperatures in such a way that the target chromaticity 65 can be obtained. The temperature-dependent characteristics appearing when theses currents are passed are stored in the control device 50.

In the first to third preferred embodiments, the location of the target chromaticity 65 is not limited to the center of the white color area 60. Any other desired chromaticity may be used instead. In this case, any one of the boundaries of subareas needs to pass through the desired chromaticity.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illumination device comprising:
   a plurality of white LEDs; and
   a control device arranged to control light emission of the white LEDs; wherein
   a white color area in a chromaticity diagram is divided into a plurality of subareas, white LEDs whose emitted light falls within any one of the subareas are provided and the control device individually controls light emission of the white LEDs whose emitted light falls within the different subareas.

2. The illumination device of claim 1, wherein light emitted by the white LEDs disposed side by side falls within the different subareas.

3. The illumination device of claim 1, further comprising a light guide plate arranged to receive light from a side surface thereof and emanating the light through an emission surface thereof, wherein the white LEDs are disposed on the side surface of the light guide plate in a line.

4. The illumination device of claim 1, wherein the white LEDs are disposed in a plane.

5. The illumination device of claim 1, further comprising a color measuring device measuring color of light emitted by the white LEDs, wherein, based on an output of the color measuring device, the control device controls the light emission of the white LEDs.

6. The illumination device of claim 1, further comprising a temperature measuring device near the white LED, wherein, based on an output of the temperature measuring device, the control device controls the light emission of the white LEDs.

7. A liquid crystal display device comprising:
   a liquid crystal panel; and
   the illumination device of claim 1 disposed on a back of the liquid crystal panel.

* * * * *